(12) United States Patent
Parrott et al.

(10) Patent No.: US 6,644,592 B2
(45) Date of Patent: Nov. 11, 2003

(54) FLOATATION SYSTEM

(75) Inventors: David G. Parrott, Escondido, CA (US); Don V. Hitzfield, Moro Azul Mission Viejo, CA (US)

(73) Assignee: Apical Industries, Inc., Oceanside, CA (US)

( * ) Notice: Subject to any disclaimer, the term of this patent is extended or adjusted under 35 U.S.C. 154(b) by 0 days.

(21) Appl. No.: 09/961,698

(22) Filed: Sep. 21, 2001

(65) Prior Publication Data
US 2003/0057322 A1 Mar. 27, 2003

(51) Int. Cl.[7] ............................................. B64C 25/56
(52) U.S. Cl. ........................................ 244/105; 244/101
(58) Field of Search ............................ 244/100 A, 105, 244/107, 905, 106

(56) References Cited

U.S. PATENT DOCUMENTS 3,507,466 A    4/1970  Fleur
4,165,059 A  * 8/1979  Summer ................... 244/100 A
4,655,415 A  * 4/1987  Miller et al. ............ 244/100 A
4,697,762 A  * 10/1987 Arney ..................... 244/100 A

FOREIGN PATENT DOCUMENTS

DE    2719089 A1 * 11/1977 ........... B64C/25/54
FR    2312408    *  5/1975 ........... B64C/05/10

* cited by examiner

Primary Examiner—Peter M. Poon
Assistant Examiner—Timothy Collins
(74) Attorney, Agent, or Firm—Luce, Forward, Hamilton & Scripps

(57) ABSTRACT

A floatation system for attachment to a helicopter landing skid includes a girt dimensioned to be attached to a landing skid and a plurality of floats attached to the elongate girt, wherein the plurality of floats are adapted to be converted from a packed configuration to an deployed configuration, and wherein at least one of the plurality of floats extends beneath the elongate girt when the plurality of floats is in the deployed configuration.

23 Claims, 2 Drawing Sheets

FLOATATION SYSTEM

FIELD OF THE INVENTION

The present invention is directed to emergency floatation devices, in general, and more particularly to emergency floatation devices for supporting an aircraft on a body of water.

BACKGROUND OF THE INVENTION

The use of floatation devices for buoyantly supporting a helicopter on a body of water has been prevalent for many years. Some helicopters are equipped with fixed utility floats. Others are equipped with inflatable floatation bags that are disposed deflated upon the landing skids. These floatation bags are inflated in order to support the helicopter when ditching or landing in water is anticipated. Typically, the floatation bags are fixedly attached to the helicopter landing skids and packed tightly within flexible fabric covers. The floatation bags are only inflated if an emergency landing on water is expected. Although conventional helicopter floatation bags can save lives, they still suffer from a variety of shortcomings, some of which are discussed below.

For example, U.S. Pat. No. 3,507,466 discloses a helicopter undercarriage including a pair of floatation bags attached to the landing skids. The preferred embodiment discloses the floatation bags disposed underneath the landing skids. A drawback with this configuration is that the floatation bags will likely be ruined if the helicopter lands on a muddy marsh area, e.g. instead of on open water. Further, since the floatation bags completely surround the landing skid, they will become worn and possibly damaged during each normal landing. Another drawback is that including only one floatation bag per landing skid does not provide ample buoyancy. A wider footprint of buoyancy is necessary to adequately support a helicopter, which may weigh over 30,000 pounds. Providing a wider footprint of buoyancy adds stability to the floating helicopter to prevent capsizing and raises the helicopter up preventing destruction of its electronics due to water damage.

Another example is U.S. Pat. No. 4,655,415, which discloses a helicopter floatation pack disposed on top of the landing skids. A drawback with this configuration is that the floatation pack does not adequately raise the helicopter above the water line such that all of the helicopter's electronics would be destroyed during an emergency landing. In addition, this configuration also suffers from an insufficiently wide footprint of buoyancy and capsizing is, therefore, a distinct possibility.

In view of these shortcomings, there exists a need for a helicopter floatation device that employs a wider footprint of buoyancy to both add stability to the floating helicopter to prevent capsizing and raise the helicopter up to prevent destruction of electronics due to water damage. Further, there is a need for a helicopter floatation device that employs floatation bags having a wider footprint of buoyancy, yet does not sacrifice durability by permanently positioning the floatation bags underneath the helicopter.

Any publications that are discussed above should not be taken as an admission that the publications are prior art.

SUMMARY OF THE INVENTION

One aspect of the present invention involves an emergency floatation system for attachment to a helicopter landing skid including an elongate girt dimensioned to be attached to the landing skid and a plurality of floats attached to the elongate girt. The plurality of floats are adapted to be converted from a packed configuration to an deployed configuration, and at least one of the plurality of floats extends beneath the elongate girt when the plurality of floats is in the deployed configuration.

A further aspect of the present invention involves an emergency floatation system for attachment to a helicopter landing skid including a plurality of floats, wherein the plurality of floats includes a first float positioned above the elongate girt and second and third floats extending beneath the elongate girt when the plurality of floats is in the deployed configuration.

Another aspect of the present invention involves an emergency floatation system for attachment to a helicopter landing skid including a plurality of floats, wherein the plurality of floats includes a small first float and a pair of larger floats, wherein the pair of larger floats are mirror images of each other with respect to a vertical plane along the longitudinal axis of the elongate girt.

Yet another aspect of the present invention involves an emergency floatation system for attachment to a helicopter landing skid including an elongate girt dimensioned to be attached to the landing skid and a plurality of floats attached to the elongate girt, wherein the elongate girt has a C-shaped cross-section adapted to fit over the landing skid, wherein the elongate girt is attached to the landing skid with a plurality of bolts, and wherein the plurality of floats is attached to the elongate girt using an adhesive such as glue.

DETAILED DESCRIPTION OF THE PREFERRED EMBODIMENTS

Figure 1:
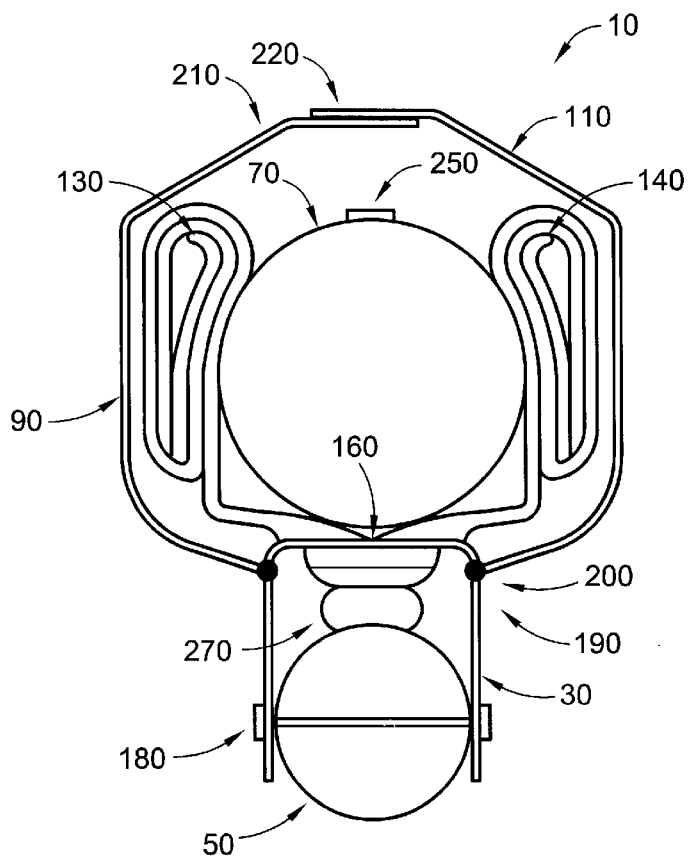
FIG. 1 depicts a sectional view of a packed emergency floatation system according to the present invention.
Figure 2:
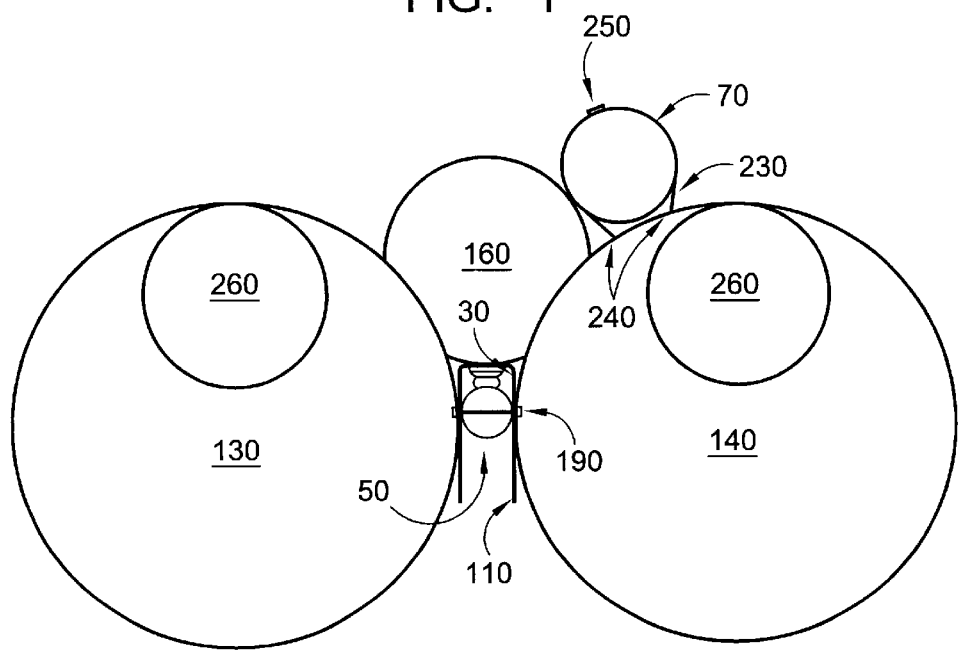
FIG. 2 depicts a sectional view of a deployed emergency floatation system according to the present invention.
Figure 3:
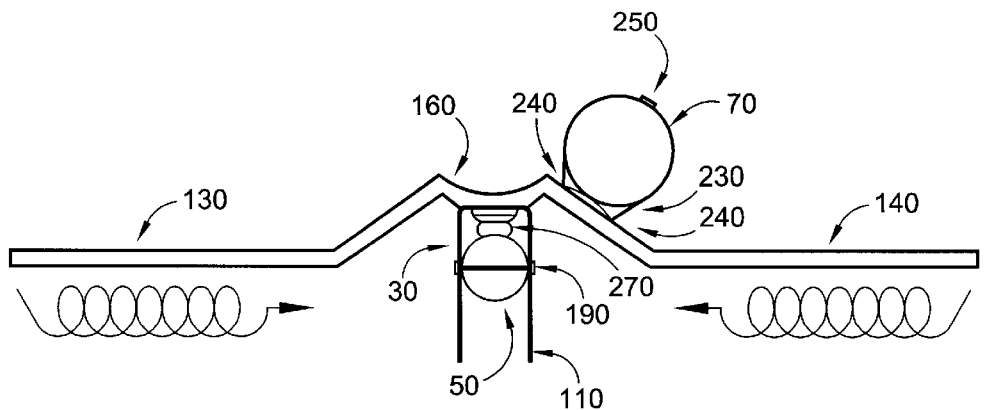
FIG. 3 depicts a sectional view of the emergency floatation system of FIG. 1 during packing.

Referring to FIGS. 1–3, an emergency floatation system 10 according to an aspect of the present invention is generally comprised of a girt member 30 having a C-shaped cross-section for attachment to a landing skid 50 of an aircraft such as a helicopter, at least one inflatable elongate float 90 and a flexible cover 110. The at least one inflatable elongate float 90 includes a pair of large side floats 130,140 connected by a smaller center float 160. Further, an inflatable life raft 70 may also be included with the emergency floatation system 10. The floatation system 10 includes a packed configuration as depicted in FIG. 1 and a deployed configuration as depicted in FIG. 2, wherein the floats 90 have been fully inflated. Unless an emergency landing in water is necessary, the floatation system 10 should remain in the packed configuration.

The emergency floatation system 10 is attached to the landing skid 50 by first slipping the girt member 30 over the top of the landing skid 50 and then firmly securing the girt member 30 to the landing skid 50 using one or more fasteners 180, such as a plurality of bolts 180. However, one of ordinary skill in the art would understand that any number of well-known mechanical fasteners could be used, including, but not limited to rivets, screws, cement, glue, epoxy resin, etc. Alternatively, the girt member 30 may be welded to the landing skid 50. Barring an emergency or a safety inspection, the floatation system 10 should remain attached above the skid 50 in the packed configuration. An advantage attaching the system 10 above the skid 50 is that the floats 90 will not become worn and possibly damaged during a normal landings.

Referring to FIG. 1, in the packed configuration, the flexible cover 110 surrounds the deflated floats 90, which are positioned around a packed life raft 70. The floats 90 are secured to the girt 30 by fixedly attaching the center float 160 to the top of the girt 30 using an adhesive such as cement, glue, epoxy resin, hinge tape or other adhesive. As best seen in FIG. 3, the deflated side floats 130,140 are rolled inwardly toward the girt member 30 before the flexible cover 110 is applied. The flexible cover 110 comprises two halves, which are fixedly attached to the girt 30 at one end 200 using an adhesive such as cement, glue, epoxy resin, hinge tape or other adhesive, and releasably attached at the other end 210 using fasteners 220 such as elongate strips of hook and loop fasteners 220, snaps, and laces 220. Preferably, these fasteners 220 are used in combination so that the cover 110 is tightly secured about the floats 90 and life raft 70. As one of ordinary skill in the art would understand, the elongate strips of hook and loop fasteners having embedded snaps are used to provide a more robust attachment of the flexible cover 110, and laces are used to tighten the attachment once the snaps and hook and loop fasteners are connected.

Referring to FIG. 2, the floatation system 10 is deployed when a water landing is required. In the deployed configuration, the elongate floats 90 are inflated while the raft 70 remains packed. In addition, the flexible cover 110 together with a pair of circular end caps 260 hang from the inflated floatation system 10. In the packed configuration, the end caps 260 are attached to the flexible cover 110 using a strip of hook and loop fasteners along the outer perimeter of the circular end caps 260. The end caps 260 may include pockets containing survival equipment.

Inflation of the floats 90 is achieved using of an actuator, such as an electrical or mechanical switch, to release a canister of compressed gas into an air hose, through inlet check valve 270 and into the floats 90. The force of the compressed gas into the floats 90 must be sufficient to disengage the fasteners 220 and pop open the flexible cover 110 and end caps 260. The canister of gas may be mounted underneath the helicopter or within the helicopter fuselage. Helium is the preferred gas because it permits a very fast rate of inflation. Other suitable gases include, but are not limited to, Nitrogen and air.

Figure 4:
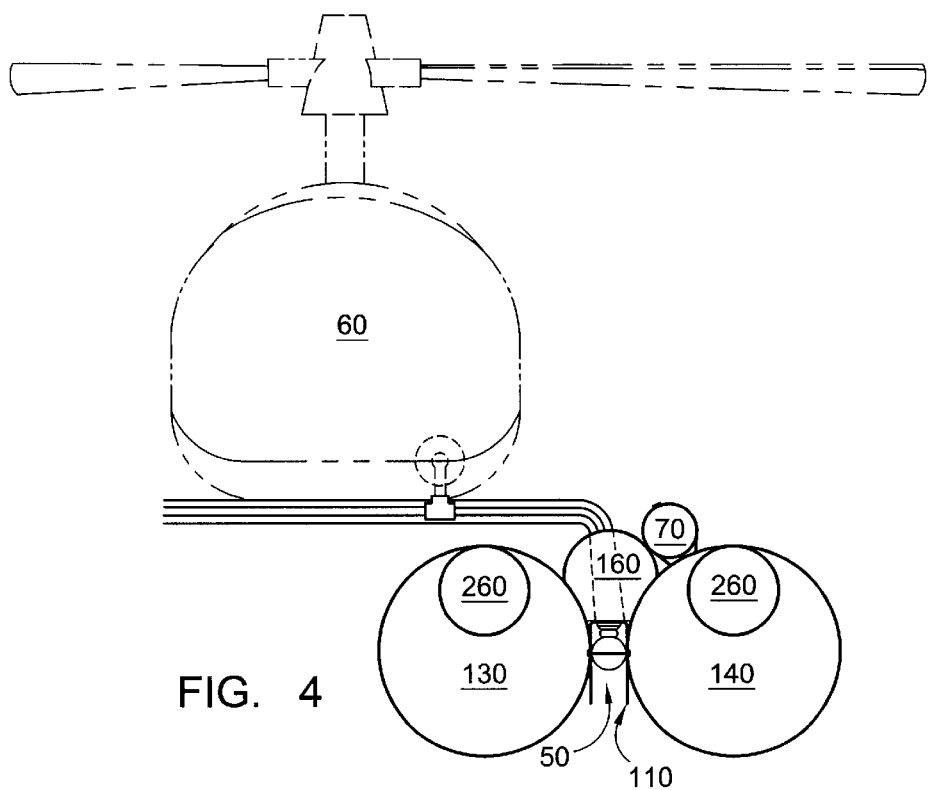
FIG. 4 depicts a sectional view of a partially deployed emergency floatation system attached to a helicopter according to the present invention.

According to the deployed float configuration depicted in FIGS. 2 and 4, the center float 160 sits atop girt member 30 and the side floats 130,140 straddle the girt 30 on either side, providing a wide footprint of buoyancy. Since there is typically only a small amount of space above the landing skid 50 for a floatation system 10, it is important that the center float 160 be small enough in size to fit between the landing skid 50 and the helicopter 60. The side floats 130,140 are mirror images of each other with respect to a vertical plane passing through the longitudinal axis of the elongate girt 30. The large side floats 130,140 extend well beneath the girt member 30, and thus, well below the landing skid 50 of the helicopter. This is important since it is imperative to adequately raise the helicopter above the water line to prevent the helicopter's electronics from being destroyed during an emergency landing. In addition, it is significant that the side floats 130,140 are large in size to maximize buoyancy and, therefore, maximize displacement below the landing skid 50. The life raft 70 is attached near the top of side float 140.

One advantage with this configuration is that the inclusion of two large side floats 130,140 and a center float 160 provides much more buoyancy than typical one-float configurations. Moreover, since the large side floats 130, 140 extend well beneath the landing skid 50, the helicopter is lifted high above the water line. Further, the floats 90 provide a wide footprint of buoyancy, which is necessary to adequately support and stabilize a helicopter that may weigh over 30,000 pounds.

Many variations of the above-described invention are possible. Such variations are not to be regarded as a departure from the spirit and scope of the invention, but rather as subject matter intended to be encompassed within the scope of the following claims, to the fullest extent allowed by applicable law.

What is claimed is:

1. An aircraft floatation system comprising:
   a girt; and
   a plurality of floats attached to the elongate girt, wherein the plurality of floats are adapted to be converted from a packed configuration to an deployed configuration;
   wherein at least one of the plurality of floats extends substantially beneath the girt when the plurality of floats is in the deployed configuration;
   wherein at least one of the plurality of floats extends substantially above the girt when the plurality of floats is in the deployed configuration;
   wherein at least two of the plurality of floats are of substantially varying sizes.

2. The floatation system of claim 1, wherein the plurality of floats includes a first float positioned above the girt when the plurality of floats is in the deployed configuration.

3. The floatation system of claim 2, wherein the plurality of floats further includes second and third floats extending beneath the girt when the plurality of floats is in the deployed configuration.

4. The floatation system of claim 3, wherein the second and third floats are substantially identical in size and shape.

5. An aircraft floatation system comprising:
   a girt; and
   a plurality of floats attached to the elongate girt, wherein the plurality of floats are adapted to be converted from a packed configuration to an deployed configuration;
   wherein at least one of the plurality of floats extends substantially beneath the girt when the plurality of floats is in the deployed configuration;
   wherein the plurality of floats includes a first float positioned above the girt when the plurality of floats is in the deployed configuration;
   wherein the plurality of floats further includes second and third floats extending beneath the girt when the plurality of floats is in the deployed configuration;
   wherein the second and third floats are substantially identical in size and shape;
   wherein the second and third floats are substantially larger than the first float.

6. The floatation system of claim 4, wherein the second and third floats are mirror images of each other with respect to a vertical plane along a longitudinal axis of the girt.

7. The floatation system of claim 1, wherein the girt has a C-shaped cross-section.

8. The floatation system of claim 7, wherein the C-shaped cross-section of the girt is adapted to fit over a helicopter landing skid.

9. The floatation system of claim 8, wherein the girt is attached to the landing skid with a plurality of bolts.

10. An aircraft floatation system comprising:

a girt; and a plurality of floats attached to the elongate girt, wherein the plurality of floats are adapted to be converted from a packed configuration to an deployed configuration;

wherein at least one of the plurality of floats extends substantially beneath the girt when the plurality of floats is in the deployed configuration;

wherein the plurality of floats includes a first float positioned above the girt when the plurality of floats is in the deployed configuration;

wherein the first float is directly attached to a top surface of the girt.

11. The floatation system of claim 10, wherein the first float is attached to the girt using an adhesive.

12. The floatation system of claim 11, wherein the plurality of floats further includes a pair of side floats positioned at either side of the girt.

13. The floatation system of claim 1, wherein the plurality of floats are deployed by inflating them with compressed gas.

14. The floatation system of claim 13, wherein the compressed gas is Helium.

15. The floatation system of claim 1, wherein the flexible float cover includes two halves, which are fixedly attached to the girt at a first end and releasably attached to each other at a second end using one or more fasteners.

16. The floatation system of claim 15, wherein the one or more fasteners are adapted to release during deployment of the plurality of floats.

17. The floatation system of claim 15, wherein the one or more fasteners are chosen from the group consisting of snaps, hook and loop fasteners and laces.

18. The floatation system of claim 1, wherein the flexible float cover includes a pair of end caps.

19. The floatation system of claim 1, wherein the system is adapted to be converted from the packed configuration to the deployed configuration using an actuating member.

20. An aircraft floatation system comprising:

a girt having a top surface;

a first float attached to the girt;

a second float attached to the girt; wherein the first and second floats have a packed and a deployed configuration;

a third float attached to the girt; wherein the majority of said third float is below the top surface of the girt when in the deployed configuration; and a cover containing the first, second and third floats when in the packed configuration;

wherein the majority of the first float is above the top surface of the girt when in the deployed configuration and the majority of said second float is below the top surface of the girt when in the deployed configuration.

21. The floatation system of claim 20 wherein the majority of said first float is above the top surface of the girt when in the deployed configuration and the majority of said second float is below the top surface of the girt when in the deployed configuration.

22. The floatation system of claim 20 further comprising an activator which when operated inflates said first, second and third floats.

23. An aircraft floatation system comprising:

a girt; and a plurality of floats attached to the elongate girt, wherein the plurality of floats are adapted to be converted from a packed configuration to an deployed configuration;

wherein at least one of the plurality of floats extends substantially beneath the girt when the plurality of floats is in the deployed configuration, wherein the plurality of floats are surrounded by a flexible float cover while in the packed configuration;

wherein the flexible float cover includes two halves, which are fixedly attached to the girt at a first end and releasably attached to each other at a second end using one or more fasteners.

* * * * *